US011847117B2

(12) United States Patent
Shanker

(10) Patent No.: US 11,847,117 B2
(45) Date of Patent: Dec. 19, 2023

(54) FILTER CLASS FOR QUERYING OPERATIONS

(71) Applicant: Capital One Services, LLC, McLean, VA (US)

(72) Inventor: Purva Shanker, McLean, VA (US)

(73) Assignee: Capital One Services, LLC, McLean, VA (US)

(*) Notice: Subject to any disclaimer, the term of this patent is extended or adjusted under 35 U.S.C. 154(b) by 217 days.

(21) Appl. No.: 17/375,193

(22) Filed: Jul. 14, 2021

(65) Prior Publication Data

US 2023/0014435 A1  Jan. 19, 2023

(51) Int. Cl.
| | |
|---|---|
| *G06F 16/2453* | (2019.01) |
| *G06F 16/23* | (2019.01) |
| *G06F 9/54* | (2006.01) |
| *G06F 16/22* | (2019.01) |

(52) U.S. Cl.
CPC ......... *G06F 16/24542* (2019.01); *G06F 9/54* (2013.01); *G06F 16/2282* (2019.01); *G06F 16/2379* (2019.01); *G06F 16/24537* (2019.01)

(58) Field of Classification Search
None
See application file for complete search history.

(56) References Cited

U.S. PATENT DOCUMENTS

| | | | | |
|---|---|---|---|---|
| 8,166,071 | B1* | 4/2012 | Korablev | G06F 21/604 707/783 |
| 8,327,419 | B1* | 12/2012 | Korablev | H04L 63/105 726/19 |
| 8,789,017 | B2* | 7/2014 | Orofino, II | G06F 9/4493 717/121 |
| 9,942,114 | B1* | 4/2018 | Arora | G06F 11/3051 |
| 2002/0147813 | A1* | 10/2002 | Teng | H04L 63/0823 709/225 |
| 2014/0067834 | A1* | 3/2014 | Hutten | G06Q 30/02 707/754 |
| 2018/0137177 | A1* | 5/2018 | Belcher | G16H 70/20 |
| 2020/0057781 | A1* | 2/2020 | McCormick | G06F 16/81 |
| 2020/0387542 | A1* | 12/2020 | Rajagopalan | G06Q 50/18 |

* cited by examiner

*Primary Examiner* — Richard L Bowen
(74) *Attorney, Agent, or Firm* — Perkins Coie LLP

(57) ABSTRACT

A data model identifying a first and second table may be stored, the first table comprising a first and second attribute, the second table comprising a third attribute. A first filter parameter of a first filter and a second filter parameter of a second filter may be obtained. A first tag value may be associated with the first and second filters. A set of filters including the first and second filters may be determined in response to a determination that the first and second filters are associated with the first tag value. An argument indicating the first and second filter parameters may be generated based on the set of filters. A call to the first table may be executed based on the argument, the execution of the call causing values of the first and second attributes to be obtained based on the first and second filter parameters.

20 Claims, 4 Drawing Sheets

FILTER CLASS FOR QUERYING OPERATIONS

BACKGROUND

Database queries are performed to store, retrieve, and update various types of records that may be of interest to a user or another computer system. The query may be sent from a first computer system via a database application program interface (API) to retrieve the data from the database. A user interface (UI) may be used to provide filter parameters that are sent to the database API to obtain data from the database. This communication between the UI and the database API may occur over a set of messages sent over wired or wireless communication links.

SUMMARY

Aspects of the invention relate to methods, apparatuses, media, or systems for increasing network and system efficiency based on previous user inputs. After obtaining a set of filter parameters from a client computing device, a computer system performs operations to retrieve a set of records based on the filter parameters that are determined from the inputs. In many cases, the set of filter parameters may correspond with attributes stored in records that are distributed across multiple tables of a data model. A multi-table query may cause noticeable degradations in the performance of a database, especially a graph-based database. These limitations may be significantly exacerbated when multiple clients attempt to access data tables of a database or a shared set of databases.

Methods and systems described herein may provide operations that may increase search responsiveness and reduce unnecessary database transactions when performing queries on a database. Some embodiments may use a set of classes to consolidate search filters for a query when making a set of database calls based on the query. Instantiated objects generated with the classes may associate tag values identifying data tables with fields of a data model or filters corresponding with the fields. The instantiated objects may be used to construct database query arguments based on the values of the objects, such as tag values, fields, filters, etc. Some embodiments may execute a set of database API calls with respect to a set of data tables such that a reduced number of values are extracted from the data table. The calls may fetch attribute values corresponding to the fields of a query and may also filter the attribute values based on the filter parameters of the query in the same query.

In some embodiments, a data model identifying a first data table and a second data table may be stored, the first data table comprising a first attribute and a second attribute, the second data table comprising a third attribute. A first filter parameter of a first filter and a second filter parameter of a second filter may be obtained. A first tag value may be associated with the first and second filters. A set of filters may be determined, the set of filters comprising the first and second filters in response to a determination that the first and second filters are associated with the first tag value. An argument indicating the first and second filter parameters may be generated based on the set of filters. A first call to the first data table may be executed based on the argument, the execution of the first call causing values of the first and second attributes that satisfies criteria to be obtained based on the first and second filter parameters.

In some embodiments, a data model may be stored, the data model indicating first and second data tables, where the first data table comprises first and second attributes, and where the second data table comprises a third attribute. A first filter parameter of a first filter, a second filter parameter of a second filter, and a third filter parameter of a third filter may be obtained. A class may be determined, where the class comprises a data retrieval method configured to retrieve one or more tags of instantiated objects that are instantiated with the class. A set of instantiated objects may be generated by instantiating the class with first and second tag values that indicate the first and second data tables of the data model, respectively. Instantiating the class may include associating the first tag value with the first and second filters based on the first and second filter parameters and associating the second tag value with the third filter based on the third filter parameter. Instantiating the class may also include retrieving a set of tags of the set of instantiated objects by using the data retrieval method, wherein each tag is associated with an instantiated object of the set of instantiated objects. A set of filters comprising the first and second filters may be determined, where each filter of the set of filters is associated with a tag of the set of tags that matches with the first tag value. An argument may be generated, the argument indicating the first and second attributes and the first and second filter parameters based on the set of filters. A first API call to the first data table based on the argument may be executed, the execution of the first API call causing values of the first and second attributes that satisfies criteria to be obtained based on the first and second filter parameters. In connection with executing the first API call, a second API call to the second data table may be executed, the execution of a second API call causing values of the third attribute to be obtained based on the third filter parameter.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Example Systems

Figure 1:
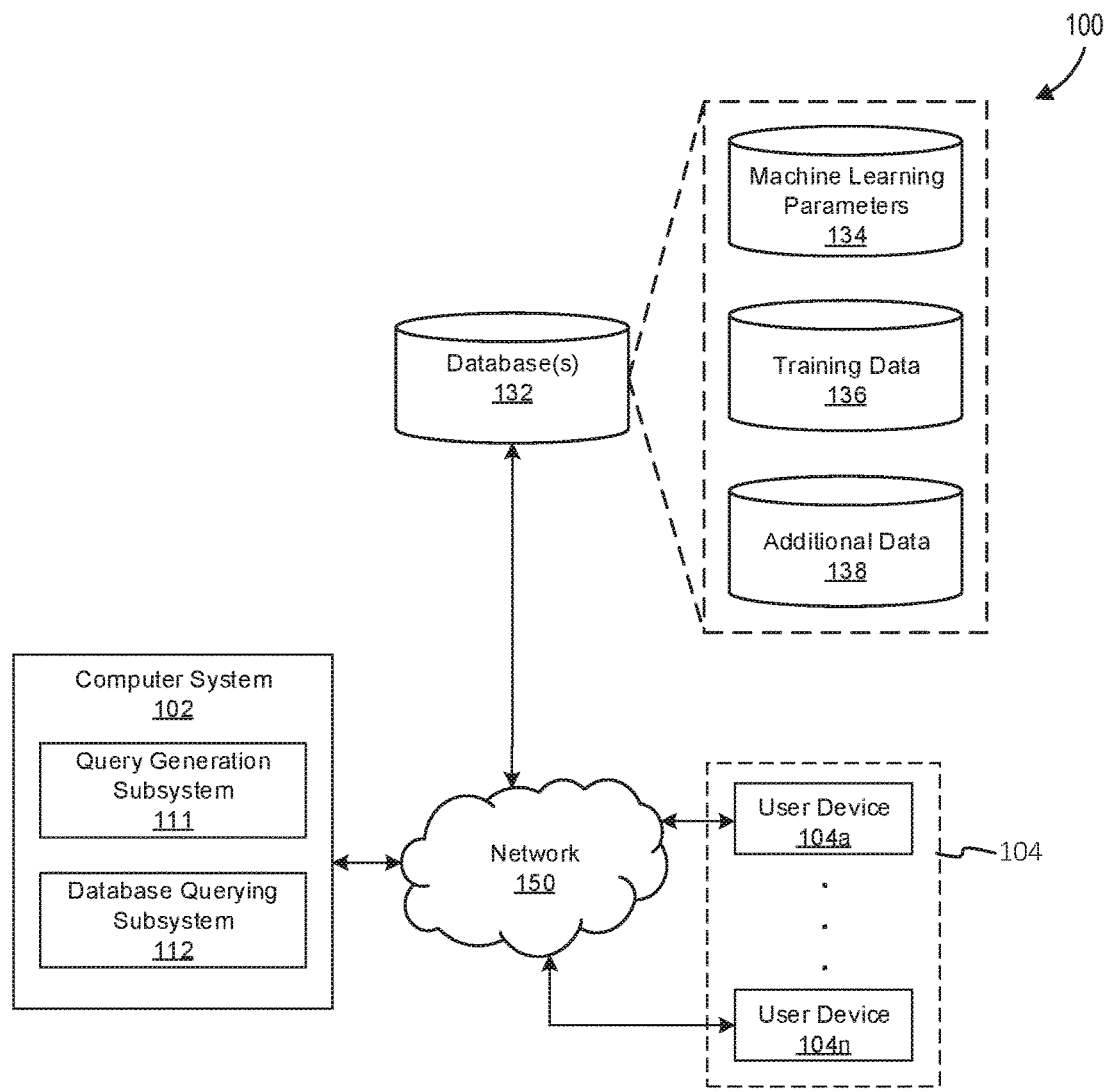
FIG. 1 shows a system for using filter classes to determine a query argument, in accordance with one or more embodiments.

FIG. 1 shows a system for using filter classes to determine a query argument, in accordance with one or more embodiments. As shown in FIG. 1, system 100 may include a computer system 102, a set of user devices 104 including user devices 104a-104n, or other components. Computer system 102 may include a query generation subsystem 111 or a database querying subsystem 112, or other components. Each user device of the set of user devices 104 may include any type of mobile terminal, fixed terminal, or another device. By way of example, a user device 104a of the set of user devices 104 may include a desktop computer, a notebook computer, a tablet computer, a smartphone, a wearable device, or another user device. Users may, for instance, utilize one or more user devices of the set of user devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of the computer system 102, those operations may, in some embodiments, be performed by components of the set of user devices 104.

In some embodiments, the system 100 may generate query arguments based on a set of input values to obtain data from multiple data tables of a database. Some embodiments may obtain filter parameters from the set of user devices 104 via a set of wired or wireless signals. For example, a user device 104a of the set of user devices 104 may display a user interface (UI) that includes UI elements such as search bars, dropdown menus, radio dials, and hyperlinks. A user may interact with these UI elements to submit a set of filter parameters from a device of the set of user devices 104, where the filter parameters may indicate different features that are stored in different data tables.

Some embodiments may use the queries when obtaining data from a database(s) 132 for training a machine learning model or performing data analysis operations. In some embodiments, training operations for a machine learning model may require the retrieval of data from large quantities of records, such as more than 1000 records, more than 100,000 records, more than 1,000,000 records, or more than some other number of records. These records may often be structured in a graph-based schema, which may create a significant number of multi-table database transactions in response to a query. However, these multi-table database transactions may often provide more values than needed because a machine learning model training operation may often use a subset of the total number attribute values of each record retrieved for a training operation. For example, some embodiments may use only three attributes of 1,000 records to train a database. Furthermore, some embodiments may train a machine learning model using data distributed across multiple tables of a data model, where values of a first set of tables may be used as training inputs and values of a second set of tables may be used as outputs. Without consolidating fields or otherwise consolidating queries to the tables of a data model, the number of database transactions to a system may quickly impact the performance of database operations.

In some embodiments, a machine learning model may include one or more neural networks that are trained from data retrieved with queries described in this disclosure. As an example, neural networks may be based on a large collection of neural units (or artificial neurons). Neural networks may loosely mimic the manner in which a biological brain works (e.g., via large clusters of biological neurons connected by axons). A neural unit may receive a set of inputs and produce a set of outputs. Each neural unit of a neural network may be connected with many other neural units of the neural network, where the output of a first neuron may be provided as an input to a second neuron. Such connections can be enforcing or inhibitory in their effect on the activation state of connected neural units. In some embodiments, each individual neural unit may use a summation function or other aggregation function which combines the values of its inputs together. In some embodiments, each connection (or the neural unit itself) may have a threshold function such that the value(s) of an input(s) must surpass the threshold before the value(s) or result of the value(s) are propagated as outputs to other neural units. These neural network systems may be self-learning and trained, rather than explicitly programmed, and can perform significantly better in certain areas of problem-solving, as compared to traditional computer programs.

The functions or internal parameters of a neural unit in a neural network or an architecture of the neural network may provide additional features, where parameters of a neural network may be retrieved using a dynamically generated set of query arguments described in this disclosure. For example, some embodiments may determine parameters for a feed-forward neural network after a user provides a first set of filter parameters that are then used to retrieve a set of training data for configuring the feed-forward neural network. Some embodiments may use a feed-forward neural network, which may provide features such as faster results. Some embodiments may use a neural network having multiple layers (e.g., where a signal path traverses from front layers to back layers) to increase accuracy. In some embodiments, back-propagation techniques may be utilized by the neural networks, where forward stimulation is used to reset weights on the "front" neural units. In some embodiments, stimulation and inhibition for neural networks may be more free flowing, with connections interacting in a more chaotic and complex fashion. As further described below, some embodiments may concurrently use different types of machine learning models to perform different tasks.

Some embodiments may obtain a set of database filter parameters from a client computing device, such as the user device 104a. The set of database filter parameters may be communicated to the computer system 102, where some embodiments may then determine a set of classes or instantiated objects corresponding with the set of classes to generate a query argument by utilizing the query generation subsystem 111 and database querying subsystem 112. As discussed elsewhere in this disclosure, some embodiments may then use the query argument generated with the database querying subsystem 112 to send a web message to the database(s) 132 and obtain a set of requested data from the database(s) 132.

Subsystems 111-112

In some embodiments, the query generation subsystem 11 may search or update, at least in part, one or more values of a database(s) 132. In some embodiments, the database(s) 132 may be structured in the form of one or data models, where a data model may be a set of data tables. Each data table of the set of data tables may include multiple records, where each record of the multiple records may include a plurality of attributes. For example, the database(s) 132 may store a data model for training a machine learning model to interpret user intent based on a set of input utterances. For example, the data model may include a model table, an utterance table, and an intent table, where each record of the model table may include one or more attributes representing model parameters of a neural network model, each record of the utterance table may include a set of strings representing transcribed utterances of a speaker, and each record of the intent table may represent a category indicating a speaker intent. Some embodiments may then access a subset of the attributes of each data table to perform a supervised learning operation that is initiated by a user of the user device 104*a*. During the supervised learning operation, a user may send a plurality of filter parameters from the user device 104*a* to the computer system 102, where the query generation subsystem 111 may associate a set of tag values with a plurality of filters. Some embodiments may then determine a set of new filters based on the previous set of filters.

In some embodiments, the query generation subsystem 111 may use a class storing filters or filter-associated data ("filter class") to instantiate objects that associate a first tag value with the first and second filters. For example, the query generation subsystem 111 may first obtain a set of filter parameters from the user device 104*a* and then instantiate an object based on the filter parameters using a filter class, where data members of the filter class correspond with the filter parameters. As used in this disclosure, a class may be a code template that is used to construct an object, where an object may store a set of fields and methods. In some embodiments, one or more data members of an instantiated object of a class may include another instantiated object that includes additional fields, which may create a chaining relationship between different fields for a query, where a query field may identify an attribute.

In some embodiments, a field of an instantiated object may be tagged with a corresponding data table indicating where the data for the field is stored, and some embodiments may detect shared tags in chained arrangements to determine a set of filters sorted by an associated tag value. For example, some embodiments may generate a first instantiated object that includes a first field tagged with a first tag value indicating a first table and a second field storing a second instantiated object, and where the second instantiated object includes a third field that is also tagged with the first tag value. Some embodiments may then determine a set of filters that includes the first and second filters based on the shared first tag value, where a method of first instantiated object may use the set of filters of the first and third fields to generate outputs for a query. The instantiation of a set of objects based on a set of obtained filter parameters allows some embodiments to keep track of what data tables of a data model should be accessed to satisfy a query.

While some embodiments describe the instantiation of a set of objects based on a filter class, some embodiments may select pre-existing objects instantiated with a filter class. For example, some embodiments may select and update a first object corresponding with a first data table, where properties of the first object may be updated to store a filter parameter, a field corresponding with an updated attribute of the first data table, etc. Alternatively, or in addition, some embodiments may use functions or procedural operations instead of objects to perform one or more operations described in this disclosure. For example, some embodiments may store a set of fields as a list of elements, where each element may include an attribute, an attribute data type, a tag value representing a data table, or another list. In some embodiments, the list of elements may be generated after obtaining a set of filter parameters, where the list includes attributes corresponding with the filters of the set of filter parameters and further includes tag values identifying data tables storing the attributes. Some embodiments may then use a first function to iterate through a nested list to determine a first set of filters associated with a first tag. Some embodiments may then generate a query argument using a second function based on the set of filters and a corresponding set of filter parameters.

In some embodiments, the database querying subsystem 112 may obtain a set of values from the database(s) 132 based on the database querying subsystem 112. For example, the database querying subsystem 112 may use an object method of a first instantiated object to produce an argument of a database query. The argument may include filter parameters indicating attributes of a data table. In some embodiments, the method used by the database querying subsystem 112 may generate an argument that includes a filter that aggregates values from different attributes, such as by summing them, determining a product based on them, or using another function to determine a function result based on the attribute values. The database querying subsystem 112 may then provide the query to the database(s) 132. Alternatively, or in addition, some embodiments may display a text version of the argument in a graphical user interface before or during an API call to a database. For example, some embodiments may call a method to generate a query argument and then display a text version of the query argument to a user device 104*a* to confirm the query argument. Upon receiving a confirmation message from the user device 104*a*, the computer system 102 will send a message to the database(s) 132 to retrieve a set of data.

In some embodiments, the database querying subsystem 112 may send the data via a web message. As described in this disclosure, a message may include a set of sub-messages sent in the form of one or more data packets sent according to an internet protocol. The message may be provided in the form of a web request or a response to the web request ("web response") sent over the Internet. For example, the message may include a web request including information encoded in the ASCII format divided into frames and including data table and attribute identifiers.

In some embodiments, the database querying subsystem 112 may prefetch data from one or more data tables based on a set of objects instantiated with the filter classes described in this disclosure. Prefetching data may include obtaining values from a set of records stored in a set of tables that are indicated by tag values of a set of instantiated objects, where the values may then be stored in a local memory device, such as a local memory device of the computer system 102. By prefetching the set of records for a graph-based data model, some embodiments may reduce the number of database transactions experienced by the database(s) 132, where the database transactions may be initiated by operations to obtain data from the graph-based data model. For example, a query generated using a set of filter classes may indicate that records from five tables of a data model are to be retrieved and access each of the five tables once. In contrast, a query to retrieve records from the five tables using a naïve graph-based search may cause some embodiments to access each of the five tables more than once, resulting in more than five data table access attempts. Such naïve queries may increase consumption of computational resources and possible delays to other concurrent data retrieval or data update operations of the database(s) 132.

In some embodiments, a web message to obtain data from the database(s) 132 may be sent via a web request. As used in this disclosure, a "web message" may include an application-layer communication to or from a web browser over a network. A web browser may include a headless browser, a browser extension, a webview object in a native application, or the like. In some embodiments, web messages may include rendered content or user inputs, and web messages may be encoded in hypertext transport language protocol (HTTP) or according to other application-layer protocols. A web message (expressed as singular) can include one or more transmissions, in some cases with intervening responsive messages, like acknowledgments or API responses.

In some embodiments, a query may be sent to an API using an HTTP POST method. A query sent via a POST method may exceed data size limitations imposed on an HTTP GET method web requests or similar web messages. By submitting requests for information via a POST request, some embodiments may provide increased search and filtering capabilities in comparison to data retrieval operations that use other types of web messages. Furthermore, while some embodiments may generate messages interpretable with a graphQL database framework, other database frameworks may be used.

Figure 2:
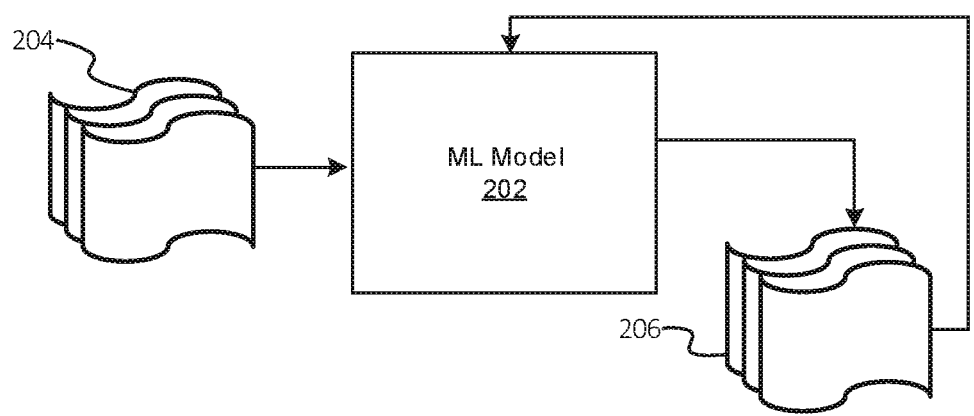
FIG. 2 shows a machine learning model that uses an object-generated query argument to obtain training data, in accordance with one or more embodiments.

FIG. 2 shows a machine learning model that uses an object-generated query argument to obtain training data, in accordance with one or more embodiments. A machine learning model 202 may be trained with inputs 204 to provide outputs 206. In some embodiments, the inputs 204 may be obtained from a set of data tables, where the inputs 204 may have been provided in response to a query generated from a method of an instantiated object or otherwise determined based on a set of filter classes. In some embodiments, the inputs 204 may include multiple datasets such as a training dataset and a test dataset from training databases, where different datasets may be obtained via updates to one or more filters of a filter class described in this disclosure.

The machine learning model 202 may use the inputs 204 to determine the output 206, where the output 206 may include text, a quantitative score, a category value, or another type of value. In some embodiments, the output 206 may then be displayed on a graphic user interface. For example, some embodiments may generate an output 206 that includes a natural language text message using the machine learning model 202, where the machine learning model 202 may be used to determine an intent based on a set of words using a set of model parameters. Alternatively, or in addition, some embodiments may use a machine learning model such as the machine learning model 202 to generate a query based on a query argument. For example, some embodiments may provide the machine learning model 202 with a set of training data that include a system-generated query argument and as a set of query parameters, where a corresponding set of training objectives may include a set of queries.

In some embodiments, the outputs 206 may be fed back to machine learning model 202 as inputs 204 to train the machine learning model 202 (e.g., alone or in conjunction with user indications of the accuracy of the outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indications of accuracy, reference labels, or other information). As described elsewhere in this disclosure, some embodiments may use the machine learning model 202 to generate or update a query based on a set of query arguments, where user indications of accuracy may be used to update model parameters of the machine learning model 202.

In some use cases, the machine learning model 202 is a neural network, and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Figure 3:
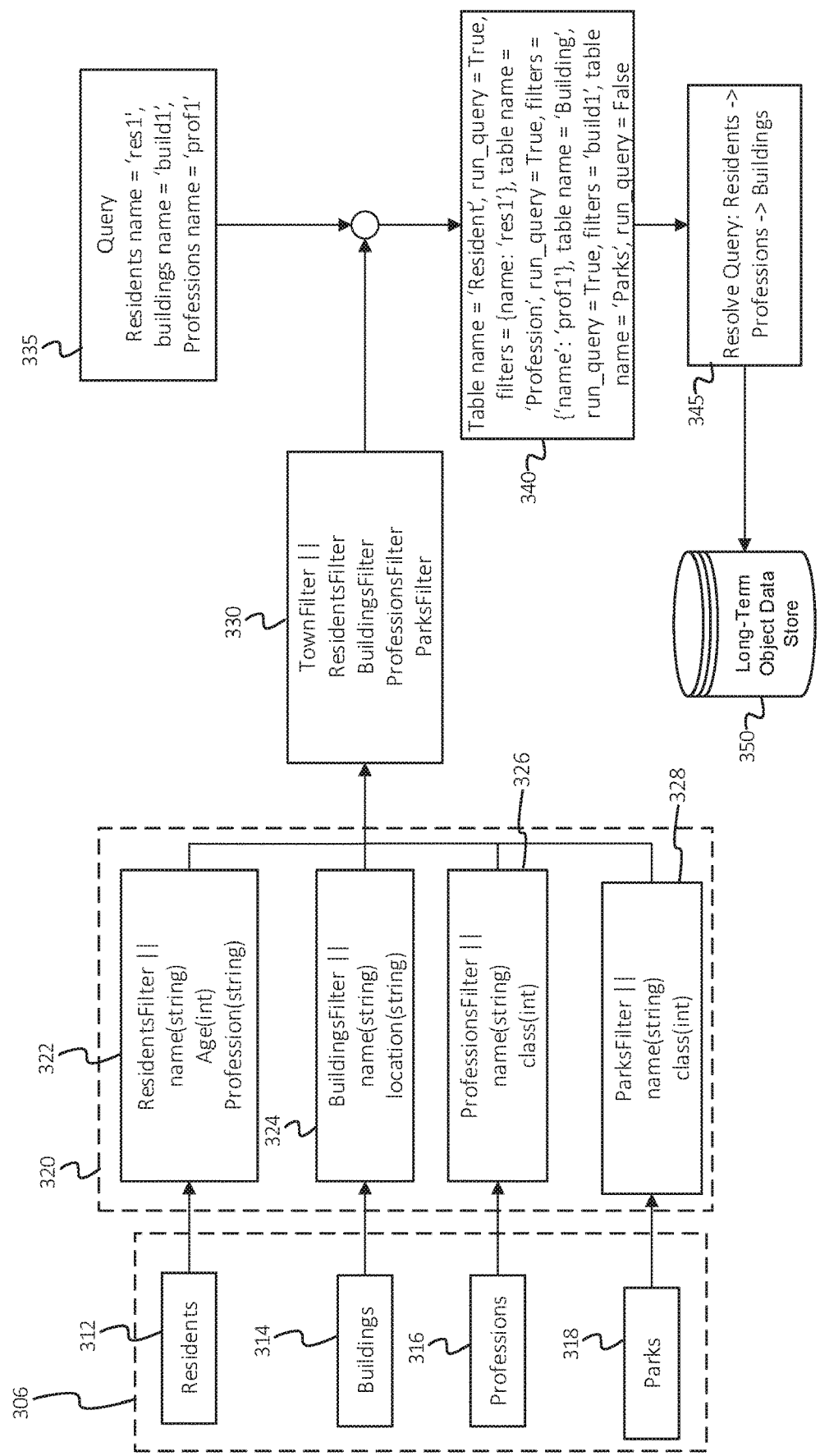
FIG. 3 shows a diagram of a data model that may be queried with the use of a set of classes, in accordance with one or more embodiments.

FIG. 3 shows a diagram of a data model that may be queried with the use of a set of classes, in accordance with one or more embodiments. The data model 306 includes a Residents data table 312, a Buildings data table 314, a Professions data table 316, and a Parks data table 318, where each of the data tables may include a plurality of attributes having one or more types. For example, the Residents data table 312 may include a "name" attribute having a data type "string," an "age" attribute having a data type "int," and a "profession" attribute having a data type "string." Some embodiments may perform one or more operations described in this disclosure to generate a set of filter classes 320 based on the set of data tables. Generating the set of filter classes 320 may include generating the ResidentsFilter class 322 based on the Residents data table 312, the BuildingsFilter class 324 based on the Buildings data table 314, the ProfessionsFilter class 326 based on the Professions data table 316, and the ParksFilter class 328 based on the Parks data table 318.

Some embodiments may generate a Town class 330 based on the set of filter classes 320. In some embodiments, instantiations of the Town class 330 may include instantiations of the classes of the set of filter classes 320. For example, an instantiation of the Town class 330 may include an instantiation of the ResidentsFilter class 322, the BuildingsFilter class 324, the ProfessionsFilter class 326, and the ParksFilter class 328. Each instantiated object of a class of the set of filter classes 320 may itself include a set of fields. For example, the instantiated object of the ResidentsFilter class 322 may include a "name" field, an "age" field, and a "profession" field.

Some embodiments may then use the Town class 330 when generating an instantiated object based on a set of filter parameters 335, where filter parameters include "Residents name='res1'," "buildings name='build'," and "Professions name='prof1'." Some embodiments may then obtain values from the generated instantiated object to extract a set of filter parameters. For example, some embodiments may first generate an instantiated object, where obtaining the set of filter parameters 335 may result in the selection and/or update of the instantiated object without instantiating a new object.

Some embodiments may then generate a set of query arguments 340 using a query plan generator based on the set of filter parameters and the fields of the instantiated objects, where a query plan generator may include a function to collect data from an object instantiated with the Town class 330. The set of query arguments 340 may be used to specify what data tables to search, which filters to apply, and/or what data table attributes to obtain. Furthermore, some embodiments may explicitly indicate one or more data tables that are not to be searched. For example, the set of query arguments 340 indicates that the table "Parks" is not to be searched by using the program instructions "run_query=false" after "name="Parks" in response to a determination that the data table "Parks" is a data table of the data model 306 but not a data table indicated by any of the data table tags associated with the set of filter parameters 335.

Some embodiments may then use the set of query arguments 340 in conjunction with the set of filter parameters 335 to generate a resolver chain 345. The resolver chain 345 may be used to retrieve data from the data store 350. As indicated by the text shown in the set of query arguments 340, the query argument may include indicators for the names of the data tables of the data model that are to be accessed. The order in which a query may be resolved may be encoded in the resolver chain 345, where the generation of the resolver chain 345 may include collecting the different tag values of instantiated objects that are instantiated using one or more filter classes to remove redundant or unnecessary database calls. The query corresponding with the resolver chain 345 may be written in a variety of graph-based languages, such as graphQL or FalcorJS, and may be generated via a data model API that is generated based on the set of query arguments 340. The query of the resolver chain 345 may then be sent to an API of the data store 350. Using a query generated based on a filter class may increase system efficiency by permitting multi-table searches in conjunction with filtering at a single endpoint of the data store 350. Such multi-table searches eliminate the need to explicitly generate or otherwise link different tables of a data model.

Example Flowchart

Figure 4:
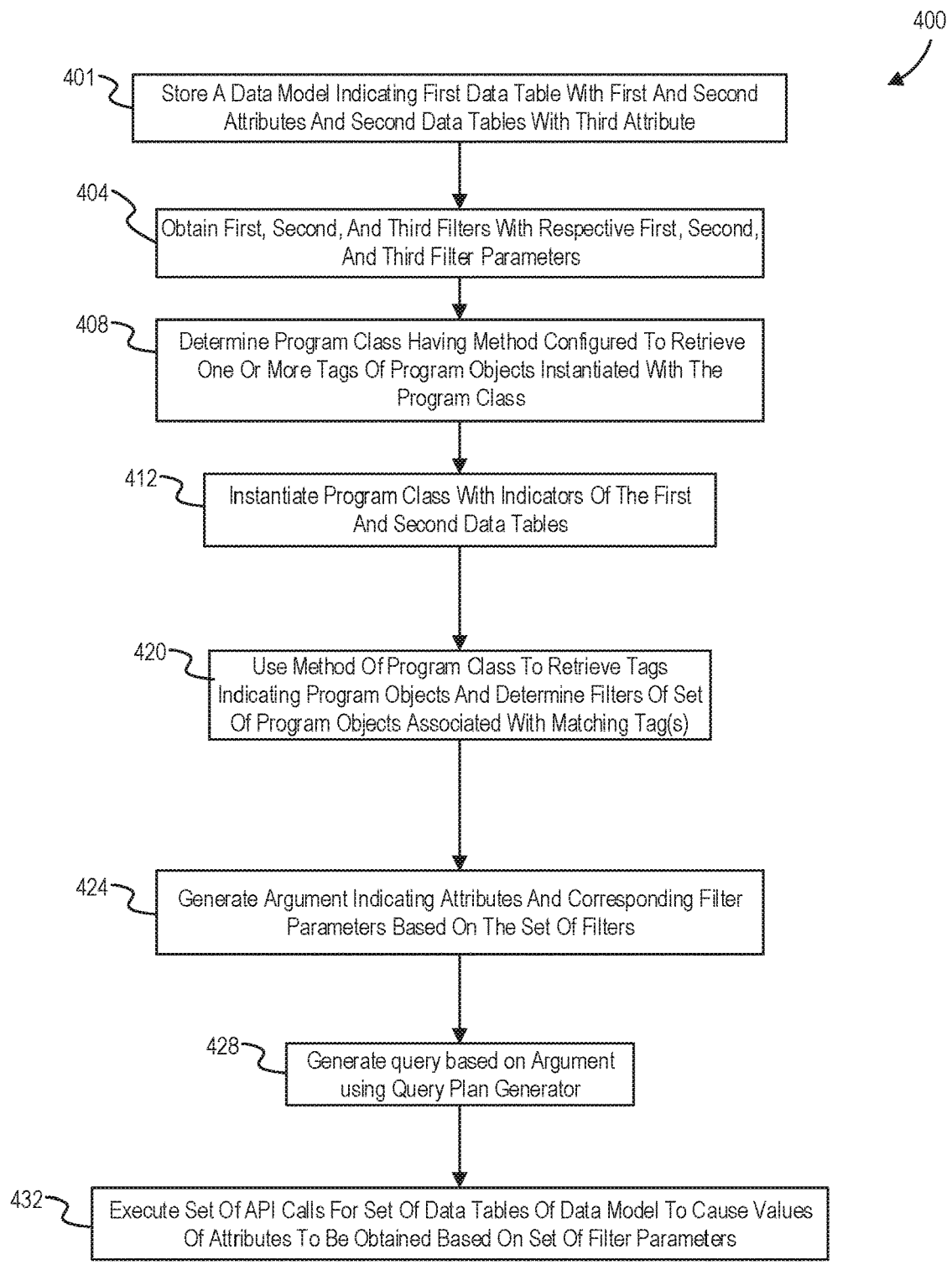
FIG. 4 shows a flowchart of operations to generate arguments of a query for a data model based on filter parameters, in accordance with one or more embodiments.

FIG. 4 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described or without one or more of the operations discussed. For example, some embodiments may perform operations of the process 400 without performing operations to execute a set of API calls, as described for the operations described for block 432. Additionally, the order in which the processing operations of the methods are illustrated (and described below) is not intended to be limiting. For example, some embodiments may perform operations described for block 408 before performing operations described for block 404.

In some embodiments, the process may be implemented in a system that includes one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of operations to generate arguments of a query for a data model based on filter parameters, in accordance with one or more embodiments. Operations of the process 400 may begin at operations described for block 401. In some embodiments, operations of the process 400 may include storing a data model indicating a plurality of data tables, as indicated for block 401. Some embodiments may store a data model by setting up the data model using a graph-based query language, such as graphQL. For example, some embodiments may use graphQL to define three data tables, where each respective data table may include records having one or more attributes that may be retrieved from the respective table.

The records of each data table may be stored in the same database or in different databases of a set of databases, where the attributes of the data tables of a data model may be associated with each other. For example, a first data table of a data model may include a record having a first attribute and a second attribute, where the second attribute may be associated with a record of a second data table, where the second data table may include a third attribute and a fourth attribute. In some embodiments, all of the attributes of a record obtained for a data model may be exposed to the data model. Alternatively, or in addition, some embodiments may use only a partial set of attributes of a record when determining a data table of a data model. For example, some embodiments may obtain a record for a data model, where the record may include a first attribute, a second attribute, and a third attribute. In some embodiments, the data model may include a data table that includes the record, where the record of the data table includes the first attribute and the second attribute without including the third attribute.

In some embodiments, operations of the process 400 may include obtaining a set of filters with a respective set of filter parameters, as indicated for block 404. A filter may be used in a query to reduce the number of results obtained from the query. For example, a user may indicate that all of the records obtained from a table should include the text "graphQL" in the attribute "name," where the filter may be identified as "name" and the corresponding filter parameter may include the text "graphQL." As described elsewhere in this disclosure, the set of filters may be used to instantiate objects or select instantiated objects, where some embodiments may then generate a query argument based on the instantiated objects.

In some embodiments, the filter parameter may also include text that is part of the query vocabulary itself. For example, a user may use the filter "name: {allofterms: 'graphQL'}," where a first filter parameter may be the filter command "allofterms" and the second filter parameter may be the text "graphQL." Furthermore, some embodiments may obtain a plurality of filters, where each filter includes or is otherwise associated with one or more filter parameters. For example, some embodiments may obtain a first filter having a first filter parameter, a second filter having a second filter parameter, and a third filter having a third filter parameter. Alternatively, or in addition, some embodiments may obtain a set of filters by obtaining fields corresponding to the set of filters. For example, some embodiments may obtain a data model directly, and determine a set of filters based on the data model.

Some embodiments may obtain a set of filter parameters via an initial query. In some embodiments, the initial query may be structured in a structured format. For example, the structured format may include a JSON or JSON-like data format, where properties and property values may be stored in a set of nested brackets, where each layer of nested values may represent an additional set of filter parameters associated with a different table. For example, some embodiments may obtain a set of filter parameters that are nested in at least three layers of a nested set of brackets, which may consequently indicate a set of filter parameters corresponding with three data tables.

In some embodiments, operations of the process 400 may include determining a filter class having a method configured to retrieve a set of tags of an associated set of instantiated objects, as indicated for block 408. In some embodiments, a filter class may be written in various programming languages capable of providing object-oriented features, such as C++, Java, Python, JavaScript, or the like. Furthermore, the classes used in this disclosure may use one or more libraries of a set of graph database libraries. For example, some embodiments may use the Graphene Python library to generate a set of messages capable of interfacing with a graphQL data model. In some embodiments, code implemented using the present techniques may be parsed to an abstract syntax tree, where the abstract syntax tree may be transformed into a bytecode representation. The bytecode representation may then be compiled into machine code, such as the native machine code of the computer executing the web browser or a machine code of a virtual machine.

Some embodiments may distribute a filter class by distributing the source code of the filter class. For example, some embodiments may distribute a code library that includes the source code for a set of classes to each client computing device of a set of client computing devices. The source code versions may then be compiled or otherwise interpreted by each of the client computing devices, where users may import the distributed library. Alternatively, or in addition, some embodiments may distribute a class by distributing a bytecode representation of the class or another intermediate representation of the class, where some embodiments may distribute bytecode versions of a class to a client computing device for efficient object generation. For example, some embodiments may distribute a bytecode version of a set of classes to a client computing device, where a user may use a graphic user interface to indicate a set of filter parameters that are then used to determine a set of program classes or parameters for the set of program classes.

In some embodiments, a class may be generated for each respective data table of a data model, where determination of a class may include selection of the class based on a set of filters. Some embodiments may generate a set of classes as part of a general data model generation operation. For example, some embodiments may generate a data model that includes a first table labeled "model," a second table labeled "utterance," and a third table labeled "intent," where each table may include a plurality of records and attributes. During or after the generation of the data tables, some embodiments may generate a class for each category, where the class name and features may be automatically or manually generated. For example, some embodiments may dynamically generate a class using program code written in the Python programming language, such as by use of the "type" function in Python, where the class may be generated to include a set of data member definitions indicating attributes or associated data tables and member method definitions to expose a value(s) of the data member definitions.

In some embodiments, other types of code templates may be used. For example, while a class may be used to generate an instantiated object, some embodiments may use a code template that generates other types of data, such as a hash table, an array, or the like. For example, some embodiments may generate a list capable of storing elements of different types, where one or more elements of the list may include sub-lists, and where one or more of the list elements include attribute identifiers, data types of an attribute, a data table-identifying tag value for an attribute, or the like.

In some embodiments, operations of the process 400 may include generating an instantiated object with fields associated with the plurality of data tables based on the filter class, as indicated for block 412. Some embodiments may use a filter class to instantiate an object having a plurality of fields, where the field may be one of various types. For example, a field of an instantiated object may be a string, an integer, a Boolean, a tuple, or the like. A field may represent an attribute of a record and may be associated with a tag value, where the tag value may identify a data table. For example, a first field of an object may represent a name field, where the first field is tagged with the tag value "Residents" to represent a data table having the identifier "Residents" and a second field of the object may represent a location field, where the location field is tagged with the tag value "Buildings" to represent a data table having the identifier "Buildings."

In some embodiments, a field of an instantiated object generated with a filter class may include another instantiated object having its own set of fields. For example, a first instantiated object may include a second instantiated object, a third instantiated object, and an integer value in a first field, a second field, and a third field, respectively. By permitting an instantiated object to include other instantiated objects within its own fields, some embodiments may encode chaining relationships between different fields or data tables.

In some embodiments, operations of the process 400 may include using a method of the set of classes to determine a set of filters associated with a matching tag, as indicated for block 420. Some embodiments may use a method defined in a filter class and usable by an instantiated object to retrieve data stored in the instantiated object. Some embodiments may then use the retrieved data to determine a set of filters based on the retrieved data. For example, some embodiments may use a first class to instantiate a first instantiated object having a data retrieval method. Some embodiments may use the data retrieval method to obtain data stored in the fields of the instantiated object, where the data may include a tag value and a set of attributes associated with the tag value. For example, some embodiments may collect a first attribute "attrib1" and a second attribute "attrib2" based on both attributes being tagged with a matching tag value "data_table_1," where the collected attributes may be used as a set of filters.

Some embodiments may determine a plurality of filters for a plurality of tables corresponding to the retrieved data table tags for nested instantiated objects. For example, some embodiments may generate a plurality of instantiated objects, some of which are nested as in the fields of other instantiated objects. In some embodiments, a data retrieval method of a first instantiated object may extract the field values of one or more instantiated objects nested within the first instantiated object. In some embodiments, a plurality of fields for different instantiated objects may be associated with a shared tag value. Some embodiments may then collect the filters associated with the field and determine a combined set of filters based on the collected filters.

In some embodiments, operations of the process 400 may include performing a set of prefetching operations to obtain data table values based on filters of the instantiated objects, as indicated for block 422. After determining a set of filters based on a set of objects, some embodiments may store one or more attribute values from data tables corresponding with the set of filters determined above. Some embodiments may then store the attribute values from the data tables in a local memory cache or send the values to a client computing device for storage in a local memory cache of the client computing device. By prefetching data from a database, some embodiments may decrease querying response time. For example, after determining a query, some embodiments may use the query to obtain data from the prefetched set of tables instead of obtaining data from a remote data store, where operations to obtain data from a local memory cache may be significantly faster than operations to obtain data from a remote data store.

Some embodiments may initiate a prefetching operation based on an interaction with a UI element. For example, some embodiments may obtain a first web message from a client computing device indicating that a user has arrived on a first UI screen. UI elements of the first UI screen may permit the user to access a set of filter classes that include member methods that retrieve data and or generate query arguments based on the retrieved data. In response to determining that the user has accessed the first UI screen, some embodiments may then prefetch data from a set of data tables stored in a remote data store based on a set of filters.

In some embodiments, operations of the process 400 may include generating an argument indicating a set of attributes and a set of filter parameters corresponding with the set of attributes based on the set of filters, as indicated for block 424. An argument for a query may include identifiers of data tables, attributes of the data tables, or filter parameters corresponding with the attributes. Some embodiments may generate the argument using a method of an instantiated object described above. For example, some embodiments may use a query plan generator to generate an argument usable for a query based on a set of filters or indicated fields, where the argument may include data table identifiers and attribute identifiers.

Some embodiments may update a UI by presenting a text version of the argument. For example, some embodiments may generate an argument, "table name='table1', run_query=True, filters={name: 'name1'}, table name='table2', run_query=True, filters={name: 'name2' }" based on a set of filters and then display a text version of the argument on a graphical display of a client computing device. After generating an argument, some embodiments may then use the generated argument to generate a query based on the argument. Alternatively, or in addition, some embodiments may generate program code or data of a graphical UI and send the program code or data to a client computing device that causes the client computing device to display the graphical UI. A user may then interact with one or more UI elements of the graphical UI to configure or otherwise update a set of filter parameters, where some embodiments may then receive a web message storing the updates to the set of filter parameters.

In some embodiments, operations of the process 400 may include generating a query based on the argument, as indicated by block 428. As described elsewhere in this disclosure, some embodiments may generate an API based on a set of query arguments generated with a query plan generator, where the API may then be used to generate a query. For example, after using a query plan generator to group filters based on their tags and associating filters with a set of fields for one or more outputs, some embodiments may present the grouped filters as part of an API. Some embodiments may then provide a set of filter parameters to the API to generate a query. Alternatively, or in addition, some embodiments may generate a query directly from the set of query arguments that was generated based on instantiated objects that are instantiated using one or more filter classes described in this disclosure.

Some embodiments may generate a query using a query template, where a set of arguments, such as a set of filter parameters or a set of data table identifiers, may be used to populate elements of the query template. For example, some embodiments may use a query template that includes the string "SELECT*WHERE_n_", and substitute '_n_' with one or more values of a filter parameter generated using one or more operations described in the process 400. Some embodiments may further count or predict the numbers of records that will be returned in response to a query to generate a query resolution order. For example, some embodiments may predict that applying a first set of filters to a first table based on a first set of filter parameters will result in the retrieval of twenty records and that applying a second set of filters to a second table based on a second set of filter parameters will result in the retrieval of five records. Some embodiments may sort a query resolution order such that the first set of filters are applied before the second set of filters are applied during query resolution, where both the first and second set of filters are generated as a result of a set of filter parameters. For example, some embodiments may determine a resolver chain that includes a nested sequence of resolver functions that encode the execution of a first resolver function before the execution of a second resolver function by a graphQL execution engine, where the first and second resolver functions cause the retrieval of data from the first and second data tables, respectively.

In some embodiments, operations of the process 400 include executing a set of API calls to access the set of data tables based on the query, as indicated by block 432. Some embodiments may execute a set of API calls by sending a query to an API of a database via a web message. For example, some embodiments may send a POST method web request to the API of a database. A POST method web request may include more than one hundred characters, more than 2048 characters, or more than 5000 characters. For example, some embodiments may obtain a POST request encoding a query, where the body of the POST request includes a graphQL argument generated using one or more operations described in this disclosure. By using a POST request, some embodiments may permit the text body of a request to exceed the 2048-character limit of a GET web request.

In some embodiments, a query resolver may be used to resolve a query without accessing a remote data store. For example, some embodiments may access prefetched data stored in a local memory when using a query. For example, instead of querying a database or sending a request to another API, some embodiments may access tables stored in a local memory cache. Furthermore, some embodiments may determine a computation result based on one or more attribute values of a data table. For example, some embodiments may compute a set of results based on a set of filter parameters indicated by an argument, where the set of results may include results of a mathematical operation, a rule-based operation, or some other operation.

In some embodiments, the query may indicate a specific set of attributes to be obtained from a data table, where operations to obtain the specific set of attributes may reduce the number of total values viewed or obtained from a data table. For example, a query may identify a first attribute "names" in association with a data table "tab1" to indicate that only the attribute "names" is necessary to extract from the data table "tab1" in order to satisfy a query. By extracting specific attribute values of a record instead of an entire set of attributes of a record when executing an API call on a database, some embodiments may reduce the expense of a database call by reducing the total number of hits to a database.

Some embodiments may obtain queries from a plurality of client computer devices, where the queries may include instructions to obtain data from more than 10,000, more than 100,000, more than 1,000,000 or more than some other number of records. Some embodiments may combine similar queries, where query similarities may be detected in the form of shared data models or shared tag values identifying data tables of the data models. In some embodiments, data objects of different queries may be collected to determine a set of related queries. Some embodiments may cache or otherwise store a set of related queries in one or more batches and execute the set of related queries in a same time interval associated with a data table. Some embodiments may then store query results in a local memory device for access by the plurality of queries.

Some embodiments may use the operations described in this disclosure to obtain large quantities of data for machine learning operations. In some embodiments, the data retrieved using filter-based classes may be used to train a machine learning model and configure a set of parameters of the machine learning model. Alternatively, or in addition, some embodiments may use pre-generated classes to dynamically generate a set of program model objects based on inputs provided by a user. For example, some embodiments may use classes described in this disclosure to obtain a set of model parameters and generate a natural language message in response to a user input.

In some embodiments, the various computers and subsystems illustrated in FIG. 1 may include one or more computing devices that are programmed to perform the functions described herein. The computing devices may include one or more electronic storages (e.g., e.g., database (s) 132, one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The network(s) 150 may include a network operating over the Internet, a mobile phone network, a mobile voice or data network (e.g., a 4G or LTE network), a cable network, a public switched telephone network, or other types of communications network or combinations of communications networks. The computing devices may include a plurality of hardware, software, and/or firmware components operating together. For example, the computing devices may be implemented by a cloud of computing platforms operating together as the computing devices.

The one or more electronic storages may include non-transitory, computer-readable storage media that electronically stores information. The storage media of the one or more electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The one or more electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The one or more electronic storages may include one or more virtual storage resources (e.g., cloud storage, a virtual private network, and/or other virtual storage resources). The one or more electronic storage may store software algorithms, information determined by the set of processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses all such attributes or functions being mapped to all such objects and subsets of the attributes or functions being mapped to subsets of the attributes or functions (e.g., a case in which all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" etc. refer to actions or processes of a specific apparatus, such as a special purpose computer or a similar special purpose electronic processing/computing device. As used in this application, updating data may include modifying data already stored in a storage or creating the data and storing the newly-created data in storage.

The present techniques will be better understood with reference to the following enumerated embodiments:

1. A method comprising: storing a data model indicating first and second data tables, the first data table comprising first and second attributes, the second data table comprising a third attribute; obtaining a first filter parameter of a first filter, a second filter parameter of a second filter, and a third filter parameter of a third filter; determining a class comprising a data retrieval method configured to retrieve one or more tags of instantiated objects that are instantiated with the class; generating a set of instantiated objects by instantiating the class with first and second tag values that indicates the first and second data tables of the data model, respectively, wherein instantiating the class comprises 1) associating the first tag value with the first and second filters based on the first and second filter parameters and 2) associating the second tag value with the third filter based on the third filter parameter, retrieving a set of tags of the set of instantiated objects by using the data retrieval method, wherein each tag is associated with an instantiated object of the set of instantiated objects; determining a set of filters comprising the first and second filters, wherein each filter of the set of filters is associated with a tag of the set of tags that matches with the first tag value; generating an argument indicating the first and second attributes and the first and second filter parameters based on the set of filters; executing a first API call to the first data table based on the argument, the execution of the first API call causing values of the first and second attributes that satisfies criteria to be obtained based on the first and second filter parameters; and in connection with executing the first API call, executing a second API call to the second data table, the execution of the second API call causing values of the third attribute to be obtained based on the third filter parameter.

2. A method comprising: storing a data model indicating a first data table and a second data table, the first data table comprising a first attribute and a second attribute, the second data table comprising a third attribute; obtaining a first filter parameter of a first filter, a second filter parameter of a second filter, and a third filter parameter of a third filter; instantiating a code template to associate a tag value with the first and second filters based on the first and second filter parameters; determining a set of filters comprising the first and second filters, wherein each filter of the set of filters is associated with a tag that matches with the tag value; generating an argument indicating the first and second filter parameters based on the set of filters; executing a first call to the first data table based on the argument, the execution of the first call causing values of the first and second attributes that satisfies criteria to be obtained based on the first and second filter parameters; and executing a second call to the second data table, the execution of a second call causing values of the third attribute to be obtained based on the third filter parameter.

3. A method comprising: storing a data model identifying a first data table and a second data table, the first data table comprising a first attribute and a second attribute, the second data table comprising a third attribute; obtaining a first filter parameter of a first filter, a second filter parameter of a second filter; associating a first tag value with the first and second filters; determining a set of filters comprising the first and second filters in response to a determination that the first and second filters are associated with the first tag value; generating an argument indicating the first and second filter parameters based on the set of filters; executing a first call to the first data table based on the argument, the execution of the first call causing values of the first and second attributes that satisfies criteria to be obtained based on the first and second filter parameters.

4. The method of any of embodiments 1 to 3, wherein generating the set of instantiated objects comprises: instantiating the class to generate a first instantiated object associated with the first filter, the first instantiated object comprising a first tag matching the first tag value; instantiating the class to generate a second instantiated object associated with the second filter, the second instantiated object comprising a second tag matching the first tag value; retrieving the set of tags comprises: using the data retrieval method of the first instantiated object to retrieve the first tag; using the data retrieval method of the second instantiated object to retrieve the second tag; and adding the first and second tags to the set of tags; and wherein determining the set of filters comprises: in response to a determination that the first tag matches the first tag value, adding the first filter to the set of filters; and in response to a determination that the second tag matches the second tag value, adding the second filter to the set of filters.

5. The method of any of embodiments 1 to 4, wherein: the second data table comprises a fourth attribute; generating the set of instantiated objects comprises generating a first instantiated object comprising: the first tag and the first and second filters; and an identifier of a second instantiated object, wherein the second instantiated object comprises a fourth filter parameter of a fourth filter corresponding with the fourth attribute and an association between the second tag with the fourth filter; the operations further comprise: determining a second set of filters associated with the second tag value, wherein each filter of the second set of filters is associated with a tag of the set of tags that matches with the second tag value; and generating a second argument indicating the third and fourth attributes and the third and fourth filter parameters based on the set of filters.

6. The method of any of embodiments 1 to 5, the operations further comprising: obtaining a fourth filter comprising a fourth filter parameter corresponding with the first attribute, wherein associating the first tag value with the first and second filters comprises associating the first tag value with the fourth filter based on the fourth filter parameter, and wherein the set of filters comprises the fourth filter; and determining a combined filter based on the first filter and the fourth filter, wherein generating the argument comprises determining a portion of the argument based on the combined filter.

7. The method of any of embodiments 1 to 6, wherein: obtaining the first, second, and third filter parameters comprises receiving, via a web request, a query comprising the first, second, and third filter parameters from a client computing device; and the operations further comprise providing the client computing device with the values of the first attribute, the second attribute, and the third attribute; and the client computing device stores the values of the first attribute, the second attribute, and the third attribute in a local memory cache of the client computing device.

8. The method of any of embodiments 1 to 7, wherein: executing the first API call to the first data table comprises generating a hypertext transfer protocol post request; the hypertext transfer protocol post request comprises the argument; and the operations further comprise sending the hypertext transfer protocol post request to an API of the first data table.

9. The method of any of embodiments 1 to 8, the instructions further comprising: generating a set of values using a machine learning model; populating values of the first attribute with the set of values; and generating a natural language message based on the set of values after executing the first API call.

10. The method of any of embodiments 1 to 9, wherein: obtaining the first and second filter parameters comprises obtaining the first and second filters in a POST request; and the POST request comprises a body having a character length greater than 2048 characters.

11. The method of any of embodiments 1 to 10, wherein the execution of the first call causes values of the first and second attributes to be obtained without causing values of a fourth attribute of the first data table to be obtained.

12. The method of any of embodiments 1 to 11, wherein: obtaining the first and second filter parameters comprises obtaining a message formatted in a structured format comprising a set of nested brackets; and the message comprises at least three layers of nested brackets.

13. The method of any of embodiments 1 to 12, wherein: instantiating the code template comprises instantiating the code template to generate a set of instantiated objects; the set of instantiated objects indicates the first attribute, the second attribute, the third attribute, and the tag that is associated with both the first and second filters: generating the argument comprises passing at least one instantiated object of the set of instantiated objects to a program function; and the program function generates the argument based on the at least one instantiated object.

14. The method of embodiment 13, wherein instantiating the code template comprises: creating a first instantiated object of the set of instantiated objects based on the first filter, wherein the first instantiated object comprises the first filter parameter and the tag value; and creating a second instantiated object of the set of instantiated objects based on the second filter, wherein the second instantiated object comprises the first filter parameter and the tag value.

15. The method of any of embodiments 1 to 14, wherein storing the data model comprises obtaining the data model, the operations further comprising: determining whether the data model has been updated to indicate a third table comprising an additional attribute; and in response to a determination that the data model has been updated, updating the code template to indicate the additional attribute.

16. The method of any of embodiments 1 to 15, wherein types of entries corresponding to the first attribute are one of a string, integer, or Boolean.

17. The method of any of embodiments 1 to 16, further comprising: obtaining a third filter, the third filter comprising instructions to aggregate a first set of values obtained from the values of the first and second attributes; aggregating the first set of values to generate a set of aggregated values based on the third filter; and providing the set of aggregated values to a client computing device.

18. The method of any of embodiments 1 to 17, further comprising displaying a text version of the argument in a graphic user interface.

19. The method of any of embodiments 1 to 18, further comprising: obtaining a program interface template; and generating an application program interface based on the program interface template by inserting the argument into a template field of the program interface template.

20. The method of embodiment 19, further comprising: obtaining a test input associated with a test query result; providing the test input to the application program interface to obtain a first query result; determining whether the test query result matches the first query result; and in response to a determination that the test query result matches the first query result, send a notification message indicating that the application program interface satisfies a test associated with the test input.

What is claimed is:

1. A system for reducing database transactions during querying, the system comprising one or more memory devices storing instructions and one or more processors configured to perform operations comprising:
storing a data model indicating first and second data tables, the first data table comprising first and second attributes, the second data table comprising a third attribute;
obtaining a first filter parameter of a first filter, a second filter parameter of a second filter, and a third filter parameter of a third filter;
determining a class comprising a data retrieval method configured to retrieve one or more tags of instantiated objects that are instantiated with the class;
generating a set of instantiated objects by instantiating the class with first and second tag values that indicates the first and second data tables of the data model, respectively, wherein instantiating the class comprises 1) associating the first tag value with the first and second filters based on the first and second filter parameters and 2) associating the second tag value with the third filter based on the third filter parameter;
retrieving a set of tags of the set of instantiated objects by using the data retrieval method, wherein each tag is associated with an instantiated object of the set of instantiated objects;
determining a set of filters comprising the first and second filters, wherein each filter of the set of filters is associated with a tag of the set of tags that matches with the first tag value;
generating an argument indicating the first and second attributes and the first and second filter parameters based on the set of filters;
executing a first API call to the first data table based on the argument, the execution of the first API call causing values of the first and second attributes that satisfies criteria to be obtained based on the first and second filter parameters; and
in connection with executing the first API call, executing a second API call to the second data table, the execution of the second API call causing values of the third attribute to be obtained based on the third filter parameter.

2. The system of claim 1, wherein generating the set of instantiated objects comprises:
instantiating the class to generate a first instantiated object associated with the first filter, the first instantiated object comprising a first tag matching the first tag value;
instantiating the class to generate a second instantiated object associated with the second filter, the second instantiated object comprising a second tag matching the first tag value;
retrieving the set of tags comprises:
using the data retrieval method of the first instantiated object to retrieve the first tag;
using the data retrieval method of the second instantiated object to retrieve the second tag; and
adding the first and second tags to the set of tags; and
wherein determining the set of filters comprises:
in response to a determination that the first tag matches the first tag value, adding the first filter to the set of filters; and
in response to a determination that the second tag matches the second tag value, adding the second filter to the set of filters.

3. The system of claim 1, wherein:
the second data table comprises a fourth attribute;
generating the set of instantiated objects comprises generating a first instantiated object comprising:
the first tag and the first and second filters; and
an identifier of a second instantiated object, wherein the second instantiated object comprises a fourth filter parameter of a fourth filter corresponding with the fourth attribute and an association between the second tag with the fourth filter;
the operations further comprise:
determining a second set of filters associated with the second tag value, wherein each filter of the second set of filters is associated with a tag of the set of tags that matches with the second tag value; and
generating a second argument indicating the third and fourth attributes and the third and fourth filter parameters based on the set of filters.

4. The system of claim 1, the operations further comprising:
obtaining a fourth filter comprising a fourth filter parameter corresponding with the first attribute, wherein associating the first tag value with the first and second filters comprises associating the first tag value with the fourth filter based on the fourth filter parameter, and wherein the set of filters comprises the fourth filter; and
determining a combined filter based on the first filter and the fourth filter, wherein generating the argument comprises determining a portion of the argument based on the combined filter.

5. The system of claim 1, wherein:
obtaining the first, second, and third filter parameters comprises receiving, via a web request, a query comprising the first, second, and third filter parameters from a client computing device; and
the operations further comprise providing the client computing device with the values of the first attribute, the second attribute, and the third attribute; and
the client computing device stores the values of the first attribute, the second attribute, and the third attribute in a local memory cache of the client computing device.

6. The system of claim 1, wherein:
executing the first API call to the first data table comprises generating a hypertext transfer protocol post request;
the hypertext transfer protocol post request comprises the argument; and
the operations further comprise sending the hypertext transfer protocol post request to an API of the first data table.

7. The system of claim 1, the instructions further comprising:
generating a set of values using a machine learning model;
populating values of the first attribute with the set of values; and
generating a natural language message based on the set of values after executing the first API call.

8. A-One or more non-transitory, machine-readable media storing instructions that, when executed by one or more processors, performs operations comprising:

storing a data model indicating a first data table and a second data table, the first data table comprising a first attribute and a second attribute, the second data table comprising a third attribute;

obtaining a first filter parameter of a first filter, a second filter parameter of a second filter, and a third filter parameter of a third filter;

generating a set of instantiated objects by instantiating a code template, wherein instantiating the code template comprises associating a tag value with the first and second filters based on the first and second filter parameters;

retrieving a tag associated with at least one object of the set of instantiated objects;

determining a set of filters comprising the first and second filters, wherein each filter of the set of filters is associated with the tag, wherein the tag matches with the tag value;

generating an argument indicating the first and second filter parameters based on the set of filters;

executing a first call to the first data table based on the argument, the execution of the first call causing values of the first and second attributes that satisfies criteria to be obtained based on the first and second filter parameters; and executing a second call to the second data table, the execution of the second call causing values of the third attribute to be obtained based on the third filter parameter.

9. The one or more non-transitory, machine-readable media of claim 8, wherein:

obtaining the first and second filter parameters comprises obtaining the first and second filters in a POST request; and the POST request comprises a body having a character length greater than 2048 characters.

10. The one or more non-transitory, machine-readable media of claim 8, wherein the execution of the first call causes values of the first and second attributes to be obtained without causing values of a fourth attribute of the first data table to be obtained.

11. The one or more non-transitory, machine-readable media of claim 8, wherein:

obtaining the first and second filter parameters comprises obtaining a message formatted in a structured format comprising a set of nested brackets; and the message comprises at least three layers of nested brackets.

12. The one or more non-transitory, machine-readable media of claim 8, wherein:

the set of instantiated objects indicates the first attribute, the second attribute, the third attribute, and the tag;

generating the argument comprises passing at least one instantiated object of the set of instantiated objects to a program function; and the program function generates the argument based on the at least one instantiated object.

13. The one or more non-transitory, machine-readable media of claim 12, wherein instantiating the code template comprises:

creating a first instantiated object of the set of instantiated objects based on the first filter, wherein the first instantiated object comprises the first filter parameter and the tag value; and creating a second instantiated object of the set of instantiated objects based on the second filter, wherein the second instantiated object comprises the first filter parameter and the tag value.

14. The one or more non-transitory, machine-readable media of claim 8, wherein storing the data model comprises obtaining the data model, the operations further comprising:

determining whether the data model has been updated to indicate a third table comprising an additional attribute; and in response to a determination that the data model has been updated, updating the code template to indicate the additional attribute.

15. The one or more non-transitory, machine-readable media of claim 8, wherein types of entries corresponding to the first attribute are one of a string, integer, or Boolean.

16. A method comprising:

storing a data model identifying a first data table and a second data table, the first data table comprising a first attribute and a second attribute, the second data table comprising a third attribute;

obtaining a first filter parameter of a first filter and a second filter parameter of a second filter;

generating a set of instantiated objects by instantiating a code template, wherein instantiating the code template comprises associating a first tag value with the first and second filters;

determining a result indicating that the first and second filters are associated with the first tag value based on data stored in the set of instantiated objects;

determining a set of filters comprising the first and second filters in response to the result indicating that the first and second filters are associated with the first tag value;

generating an argument indicating the first and second filter parameters based on the set of filters; and executing a first call to the first data table based on the argument, the execution of the first call causing values of the first and second attributes that satisfies criteria to be obtained based on the first and second filter parameters.

17. The method of claim 16, further comprising:

obtaining a third filter, the third filter comprising instructions to aggregate a first set of values obtained from the values of the first and second attributes;

aggregating the first set of values to generate a set of aggregated values based on the third filter; and providing the set of aggregated values to a client computing device.

18. The method of claim 16, further comprising displaying a text version of the argument in a graphic user interface.

19. The method of claim 16, further comprising:

obtaining a program interface template; and generating an application program interface based on the program interface template by inserting the argument into a template field of the program interface template.

20. The method of claim 19, further comprising:

obtaining a test input associated with a test query result;

providing the test input to the application program interface to obtain a first query result;

determining whether the test query result matches the first query result; and in response to a determination that the test query result matches the first query result, send a notification message indicating that the application program interface satisfies a test associated with the test input.

* * * * *